BURR & MARTYN.
Machine for Hulling and Scouring Wheat.
No. 70,073.
Patented Oct. 22, 1867.
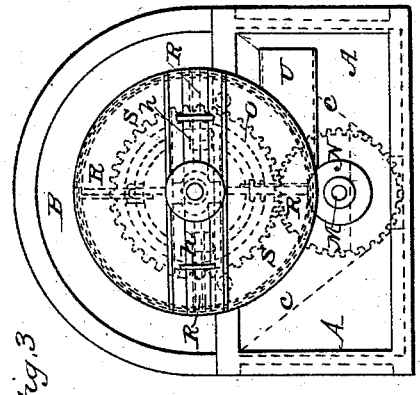
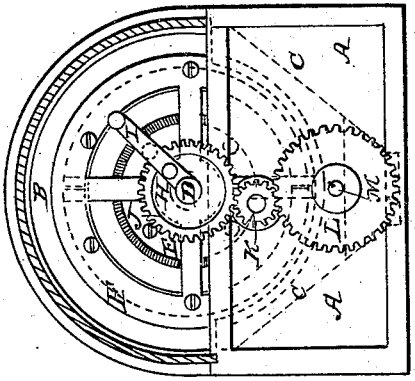
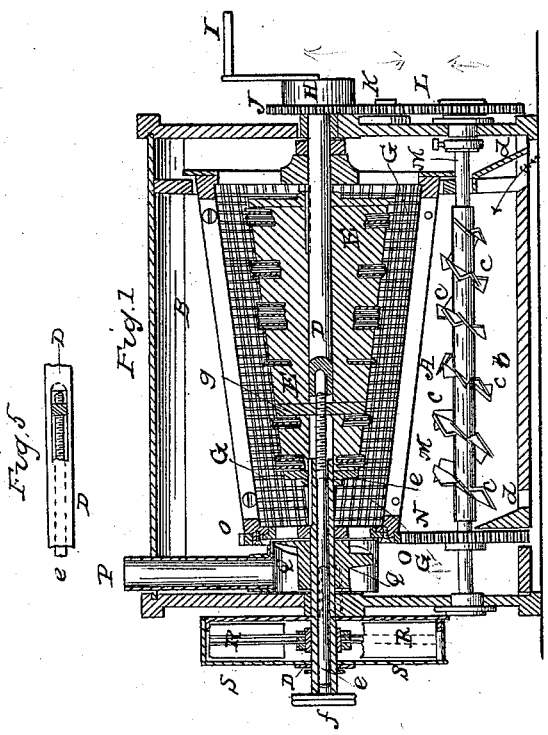
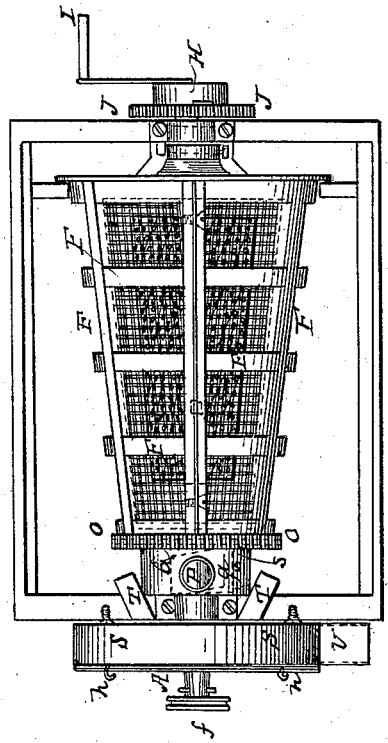
WITNESSES
INVENTORS

United States Patent Office.

NATHANIEL M. BURR AND WILLIAM MARTYN, OF PAWTUCKET, RHODE ISLAND.

Letters Patent No. 70,073, dated October 22, 1867.

IMPROVED MACHINE FOR HULLING AND SCOURING WHEAT.

The Schedule referred to in these Letters Patent and making part of the same.

TO ALL WHOM IT MAY CONCERN:

Be it known that we, NATHANIEL M. BURR and WILLIAM MARTYN, of Pawtucket, in the county of Providence, and State of Rhode Island, have invented certain new and useful improvements in Machines for Hulling or Scouring Wheat or any other grains; and that the following is a full, clear, and exact description of the same, reference being had to the accompanying drawings, making a part of this specification, in which—

Figure 1 represents a vertical central section through the machine.

Figure 2 represents a top plan, with the cover removed to show the interior.

Figure 3 represents an elevation of that end of the machine where the feeding in of the grain takes place, and where the suction-fan is placed.

Figure 4 represents an elevation of the opposite end of the machine, where the driving-gear is mainly located.

Figure 5 represents, detached from the machine, the device for adjusting the cone to the cylinder.

Similar letters of reference where they occur in the several separate figures denote like parts of the apparatus in all the drawings.

Our invention relates to a grain-hulling or scouring machine in which a rough-surfaced cone revolves inside of a revolving cone-shaped screening-cylinder, but in a direction contrary to that of the latter, into and between which cylinder and cone the grain to be hulled or scoured is fed by a forced feed, and from the chamber containing said cone and cylinder, the cleanings, scourings, hulls, dust, &c., are drawn, by a forced current of air, created by a suction-fan, whilst the cleaned or hulled grain is carried out of the machine at a separate and remote point from where the cleanings or scourings are taken off.

To enable others skilled in the art to make and use our invention, we will proceed to describe the same with reference to the drawings.

A represents a rectangular-shaped box, having a semicircular cover, B, upon it. The sides of the box, in the interior thereof, as shown by the lines C C, figs. 3 and 4, incline towards each other so as to form a kind of hopper-bottom on the inside. Upon a main shaft, D, supported and turning in suitable boxes or bearings in or on the box or case A, there is placed a cone, E, which turns with the said shaft, though it is adjustable thereon in the line of its length, as will be hereafter described. Upon the surface of the cone are placed (by preference in spiral rows) wire teeth, or other equivalent durable and efficient covering, for moving and rubbing the grains to divest them of their hulls or coatings. There is also hung to or upon this shaft D a cone-cylinder, G, made of woven or reticulated wires, secured to a frame, F, but the cylinder G, though hung to or on the shaft D, does not revolve with it. On the contrary, it revolves in a direction contrary to that of the shaft and the cone, as follows:

Upon the end of the shaft D, outside of the box or case, there is a pulley, H, or a crank, I, by which it is turned from any first-moving power. There is also upon this end of the shaft a gear-wheel, J, that turns an intermediate gear, K, which latter gear-wheel K meshes with and turns another gear L, which is upon the end of the conveyor-shaft M, and thus gives motion to the conveyor-shaft, and in the same direction that the shaft D moves in, the intermediate gear effecting this purpose. And upon the conveyor-shaft M, and at or near the end most remote from its gear L, there is placed a cogged gear, N, which works into a gear, O, on the small end of the cone-cylinder, and revolves it. This system of gearing causes the cone-cylinder to revolve in a direction precisely contrary to that of the cone itself, though both are hung on the same shaft. The grain acted upon passes between the cone and the cylinder, and is cleaned, scoured, or hulled by the attrition it receives, and falls out of the large end of the cylinder, and through the opening a, whence it may be carried to any suitable receptacle, or run into the mill-hopper, or between the grinding-stones. The screenings drop through the meshes of the cone-cylinder, and the lighter portions are drawn out of the chamber by the suction-fan, as will be explained hereafter, and the heavier portions falling upon the bottom b, are, by the wings c on the conveyor-shaft M, moved along and drop out at d. The cleaned grain, after it falls below the opening a, is also within the influence of the suction-blast, and any light impurities still remaining with it are taken up by the suction-blast and carried out of the machine.

The grain is fed into the machine through a tube, P, and falls upon a screw-shaft or feeder, Q, by which it is forced and carried, with great regularity, in between the cone and the cylinder. Whilst the cone turns with the shaft D by means of a "feather" in one and a groove in the other, or a spline and groove, the former can move on the latter longitudinally, to adjust and regulate the space between them, which in effect adjusts and regulates the amount or extent of the friction or attrition upon the grain that is being operated upon. The nearer the cone is drawn to the smaller end of the cylinder, the nearer will their surfaces approach each other, and the more remote it is from the small end of the cylinder the more remote will be their rubbing surfaces. The shaft D, throughout a portion of its length, is hollow, and a screw-rod, e, passes into it, and has upon its outer end a thumb-nut, f, or its equivalent, by which it may be turned. This screw-rod e works in a nut, g, set in the cone, and by turning the rod the cone can be moved longitudinally upon the shaft to adjust it. I have called the device in which the screw-rod e works a nut. It may not be a full nut, as a section of a nut will answer. Anything that will take and hold upon the threads of the screw-rod will serve the purpose. A full nut would require a separation of the shaft, whilst a section of a nut, or a pointed stud, could pass through a slot in the shaft, and take into the screw-threads and serve the purpose as well, and probably better than a full nut. Upon that end of the shaft D most remote from the pulley or crank by which it is driven, and on the outside of the box or case A B, there is a fan-wheel, R, that revolves in a fan-case, S. The fan is so turned as to draw the air into its case S, through the tubes or trunks T, from the interior of the hulling or scouring-chamber, and pass all the dust, dirt, hulls, and lighter particles out through the trunk U, whence it is carried, if necessary, clear out of the building. The grains, which from their greater specific gravity are not influenced by this suction-blast, drop down and are carried off as hereinbefore explained. And that the blast may be regulated if excessive, slides h h are arranged on the fan-case, which may be moved to uncover openings through which the fan may draw a portion of the incoming air, and thus diminish the volume coming from the interior of the machine.

Having thus fully described our invention, what we claim therein as new, and desire to secure by Letters Patent, is—

In combination with the cone and screening-cylinder, the former running inside of the latter, and made adjustable in relation to it, and both enclosed in a box or case, and revolving in opposite directions therein, the suction-fan on the exterior of said box or case, and drawing the dust, hulls, &c., from its interior through closed passages, whilst the cleaned grain, by its greater specific gravity, is separated and passed off through other avenues, substantially as herein described and represented.

NATHANIEL M. BURR,
WILLIAM MARTYN.

Witnesses:
P. E. TILLINGHAST,
EDWARD PEARCE.